June 29, 1965    E. A. WHATELEY    3,191,731
CONTROL MEANS FOR EPICYCLIC POWER TRANSMISSION MECHANISMS
Filed Oct. 11, 1961    2 Sheets-Sheet 1
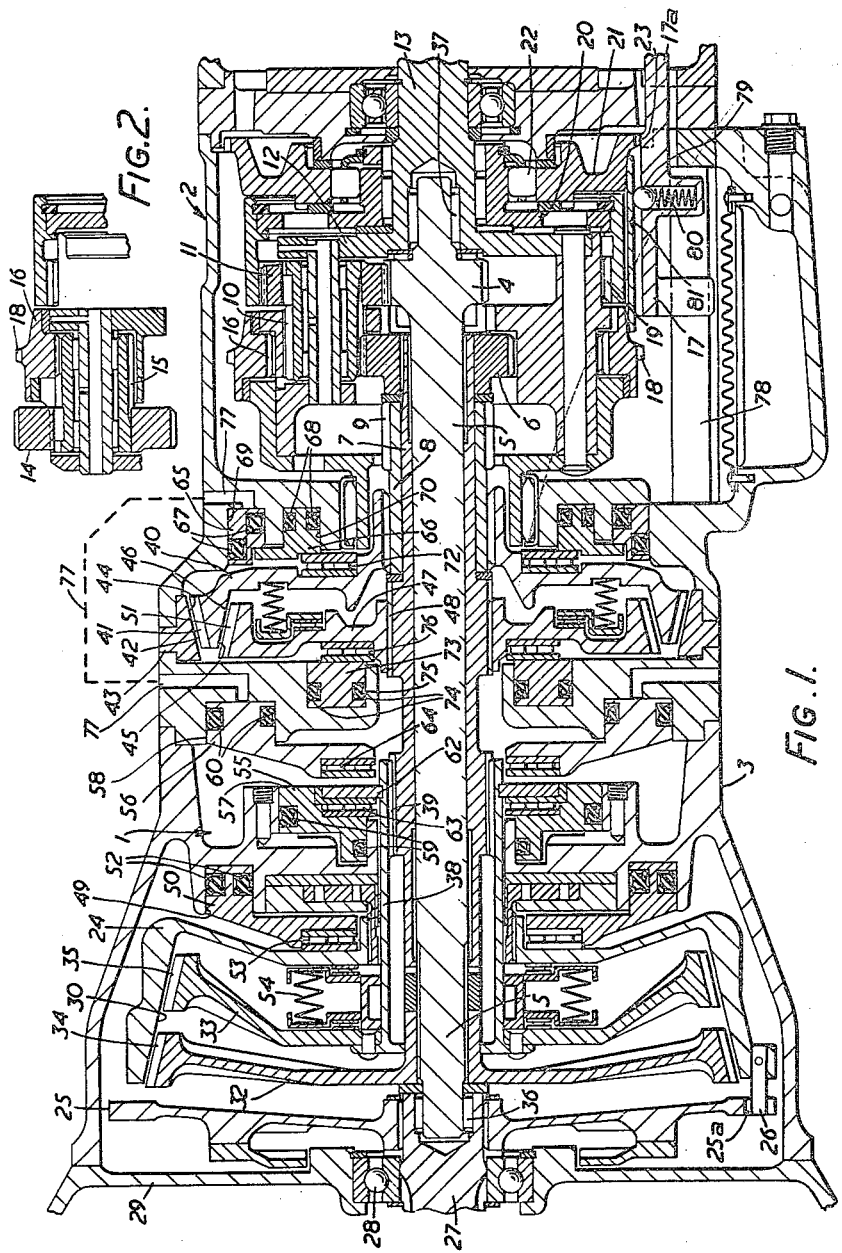
INVENTOR
ERIC ALBERT WHATELEY
BY
Irwin S. Thompson
ATTORNEY INVENTOR
ERIC ALBERT WHATELEY
BY
Irwin S. Thompson
ATTORNEY

3,191,731
CONTROL MEANS FOR EPICYCLIC POWER
TRANSMISSION MECHANISMS
Eric Albert Whateley, Coventry, England, assignor to
Axel Charles Wickman
Filed Oct. 11, 1961, Ser. No. 144,488
Claims priority, application Great Britain, Oct. 12, 1960, 34,894/60
6 Claims. (Cl. 192—3.6)

This invention relates to epicyclic power transmission mechanisms for road vehicles or other purposes of the kind which include two driving elements either of which can be used for imparting driving motion to the mechanism. The invention is an improvement in or modification of the invention disclosed in my co-pending patent application No. 63,322 filed October 18, 1960.

In said co-pending application I have described fluid-pressure operated control means for mechanisms as aforesaid, comprising clutch means for alternatively transmitting the drive to one or other of the two driving elements of the transmission mechanism and for controlling a reaction pinion of the mechanism. These clutch means include a driving clutch member, two driven clutch members for frictional clutching engagement with the driving clutch member and respectively adapted to transmit the drive to the driving elements, means for selectively engaging the driven clutch members with the driving clutch member, a further clutch member associated with the reaction pinion, and means for actuating a still further clutch member which co-operates with the clutch member associated with the reaction pinion.

The object of the present invention is to provide an advantageous modification of the fluid-pressure operated means for actuating the clutch members which can suitably be used with a 5-speed and reverse epicyclic transmission mechanism.

Control means in accordance with the present invention include a fluid-operated piston for imparting axial movement to the driving clutch member, two fluid-operated pistons for imparting opposite axial movements to one of the driven clutch members, two fluid-operated pistons for actuating the clutch member associated with the reaction pinion of the transmission mechanism, one of which latter pistons is connected in the fluid sense with one of said two oppositely-acting pistons, and a fluid-operated piston for actuating the clutch member which co-operates with the clutch member associated with the reaction pinion.

The driving elements may comprise two coaxial sun pinions of the epicyclic mechanism of different diameters and respectively in driving connection with the two driven clutch members. The driving clutch member is conveniently in permanent driving connection with a main input shaft of the mechanism and it preferably has, as disclosed in the aforesaid application, an inner peripheral clutch surface of frusto-conical form for engagement with the driven clutch members. The latter members are then of different effective diameter and are axially spaced with outer frusto-conical clutch surfaces formed to suit the inner clutch surface of the driving clutch member.

Preferably the clutch member associated with the reaction pinion can alternatively be clutched to a fixed member or brake ring to brake the pinion or to said co-operating clutch member which is connected to an element of the epicyclic mechanism. This latter element may be one of the sun pinions.

Each of the fluid-operated pistons is conveniently of annular form, provided with suitable seals and arranged in a corresponding annular pressure cylinder. A suitable thrust race is preferably arranged between each piston and the corresponding clutch element which that piston actuates.

Any suitable valve mechanism can be employed for the selective feed of pressure fluid, which will normally be oil, to the pressure cylinders. The valve mechanism itself forms no part of the invention, and is designed to feed the cylinders in the correct sequence which will be clear from the following description.

The invention will now be further described with reference to the accompanying drawings which illustrate, by way of example, a 5-speed and reverse epicyclic transmission mechanism for a road vehicle utilising control means in accordance with the invention, and in which:

FIGURE 1 is an axial sectional view of the transmission system,

FIGURE 2 is a detail view of some internal elements not shown in FIGURE 1, and

Figure 3:
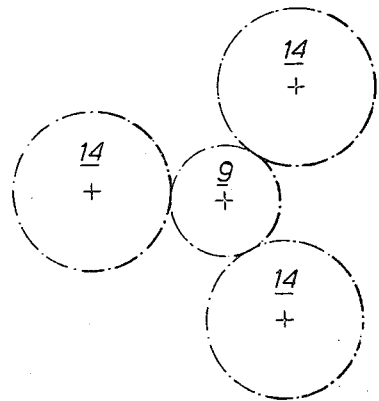
Figure 4:
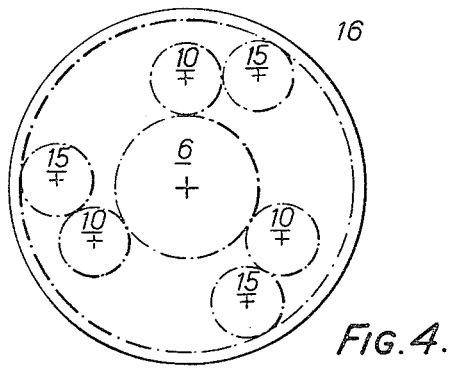
Figure 5:
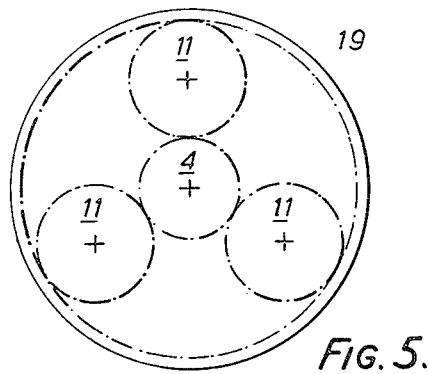

FIGURES 3, 4, and 5, are diagrammatic cross-sections through the epicyclic gear mechanism showing the gear circles, taken respectively through the sun pinion 9, through the sun pinion 6, and through the sun pinion 4.

The transmission mechanism comprises the control means which are indicated generally at 1 and the epicyclic mechanism indicated generally at 2 housed in a common housing 3.

The elements of the epicyclic mechanism 2 will first be described so that the function of the control means will be clear when later described. The 5-speed and reverse mechanism 2 comprises a first driving element or sun pinion 4 formed on a primary input shaft 5 and a second driving element or sun pinion 6 secured to a secondary input shaft 7 of sleeve-like form arranged coaxially around the input shaft 5. On a sleeve 8 mounted on the secondary input shaft 7 there is formed a reaction pinion 9 which is controlled by the control means in a manner described hereinafter.

The sun pinions 4 and 6 respectively engage compound planet pinions 11 and 10 mounted on a planet pinion carrier 12 which is formed on an output shaft 13. The planet pinion 10 engages the smaller pinion 15 of two further compound planet pinions 14 and 15 (see FIGURE 2) which respectively engage the reaction sun pinion 9 and a reverse-motion internally toothed annulus 16. Each set of compound planet pinions 10, 11 and 14, 15 is formed as an integral unit in the drive sense. The annulus 16 can be held against rotation by a slidable pawl 17 movable by external control means through an extension 17a, and this pawl is arranged for engagement with external teeth 18 on the annulus 16.

The planet pinion 11 is engaged by an internally-toothed reaction annulus 19 secured to a disc 20 which is coupled to a disc 21 through a unidirectional device 22. The latter disc 21 has external peripheral teeth 23 which can be engaged by the slidable pawl 17 in its rearward position as shown in FIGURE 1.

The control means comprise an axially movable driving clutch member 24 which is coupled to a driving disc 25 by a ring of peripheral axially extending drive pins 26 which are fixed in the clutch member 24 and engage radial slots 25a in the disc 25. The disc 25 is fixed on a main input shaft 27 mounted in a bearing 28 in a front wall 29 of the housing 3. The front of the housing 3 is shown broken away in the drawings and is shaped for bolting to the rear or output end of an engine by which the transmission is to be driven. The front of the housing 3 is conveniently formed as a bell housing for a clutch through which the engine, which is not illustrated, drives the input shaft 27.

The clutch member 24 has an inner peripheral surface 30 of truncated conical form, increasing in diameter towards the front or input end of the transmission. Within the clutch member 24 are contained two driven clutch members 32 and 33 of differing diameter which are spaced axially of the clutch member 24. The outer peripheries of the clutch members 32 and 33 are fitted with bands of friction material 34 and 35 presenting outer clutch surfaces of frusto-conical form adapted for frictional engagement with the inner surface 30 of the clutch member 24.

The front driven clutch member 32 of larger diameter is secured to the shaft 5 on which the sun pinion 4 is formed, this shaft being supported at the forward end in needle roller bearings such as 36 in the rear end of the input shaft 27 and at the rear end in needle roller bearings such as 37 in the forward end of the output shaft 13. The other driving clutch member 33 is riveted to a sleeve 38 which is rotationally coupled through a sliding spline connection 39 to the sleeve 7 on which the other sun pinion 6 of the epicyclic mechanism is fixed.

The reaction pinion 9 is connected through the sleeve 8 to a brake disc 40 having an outer peripheral band of friction material 41 presenting an outer frusto-conical brake surface. This surface cooperates with a complementary annular brake member 43 which as shown is sandwiched between adjacent sections of the housing 3 and has an inner frusto-conical clutch surface 44 for braking engagement with the surface 42. The disc 40 also has an inner peripheral clutch surface 45, also of frusto-conical form, arranged for clutching engagement with the outer clutch surface 46 of a further clutch disc 47 provided with an outer band of friction material 51. This disc 46 has a sliding spline connection 48 through which it is coupled to and rotates with the sleeve 7 on which the sun pinion 6 is secured.

An annular cylinder 49 formed in the housing 3 contains an annular piston 50 provided with suitable lip-type seals 52. Hydraulic fluid can be fed to the cylinder 49, through a control circuit which is not illustrated, to expel the piston 50 which displaces the clutch member 24 axially towards the front or input end of the housing 3. The piston 50 acts on the clutch member 24 through a thrust race 53 against the action of return springs such as 54 between the clutch members 24 and 33.

Two other annular pistons 55 and 56 are respectively mounted in a similar manner in facing annular cylinders 57 and 58 formed in the housing. These pistons are also provided with seals 59 and 60, and they are respectively arranged at opposite sides of a flange 62 projecting from the sleeve 38. Thus the pistons 55 and 56 act on the flange 62 through thrust races 63 and 64 respectively in a manner which enables them to impart opposite axial movements to the driven clutch member 33.

Two other annular pistons 65 and 66 are respectively provided with seals 67 and 68 and concentrically arranged in annular cylinders 69 and 70 in the housing 3. Both these pistons 65 and 66 act on the clutch disc 40 in the same direction through a thrust race 72. The piston 66 has a radially outwardly projecting flange which is engaged by the piston 65 on movement of the latter to ensure that the piston 65 must act through the piston 66 on the clutch disc 40.

A further annular piston 73 with seals 74 slides in an annular cylinder 75. This piston serves to effect clutching engagement of the clutch discs 40 and 46, acting through a thrust race 76.

The pistons 65 and 66 thus both act to hold the brake disc 40, and hence the reaction pinion 9, stationary with the housing 3 through the medium of the member 43 which forms a fixed brake ring.

The cylinder 58 containing the piston 56 is connected by a passage 77, in part shown diagrammatically outside the casing 3, to the cylinder 69 containing the piston 65. This ensures that at all times the pistons 58 and 69 work in unison.

The pawl 17 slides on a rod 78 fixed in the housing 3 between the two terminal positions in which it respectively engages the disc 21, as shown in FIGURE 1, and the annulus 16. A detent ball 79 loaded by a spring 80 engages a detent recess 81 to hold the pawl 17 in an intermediate inoperative position in which it engages neither the disc 21 nor the annulus 16.

The mode of action of the above-described control means and the operation of the mechanism as a whole is as follows:

In the neutral gear position none of the hydraulic pistons is acted upon by fluid pressure, so that the pistons are in the inoperative positions shown in FIGURE 1. In addition, the pawl 17 is in the intermediate inoperative position just described so that it is ineffective to control either reaction annulus 16 or 19.

To obtain the first speed, the reaction annulus 19 is locked by the driver by means of the pawl 17 through the oneway device 22, as shown in FIGURE 1, and the piston 50 is energised to engage the driving clutch member 24 with the larger driven clutch member 32, so causing motion to be transmitted to the smaller sun pinion 4. Thus the drive is transmitted to the output shaft 13 through the planet pinions 11 with the pinions 11 running around the inner periphery of the reaction annulus 19 with which they mesh. As shown, the driven clutch member 32 is axially located and the clutching movement of the driving clutch member 24 is insufficient for it to engage the other driven clutch member 33 which thus runs free. The illustrated position of the pawl 17 is retained for all five forward speeds.

To obtain the second speed, the piston 50 remains energised and the piston 55 is brought into action. The pressure exerted by the piston 55 overcomes the force exerted by the piston 50 and so causes the smaller driven clutch member 33 to be moved axially into clutching engagement with the driving clutch member 24. The concurrent small axial movement of the driving clutch member 24 releases the larger driven clutch member 32 which now runs free. The driving motion is then imparted to the larger sun pinion 6, and the drive transmitted to the output shaft 13 through the planet pinions 10, 11, the annulus 19 remaining stationary.

To obtain the third speed, the pistons 50 and 55 remain energised, and the pistons 56, 65 and 66 brought into action. The effect of the piston 56 is to displace the clutch member 33 and restore the connection between the driving clutch member 24 and the larger driven clutch member 32 under the action of the piston 50. In the displacement of the clutch member 33 the piston 56 overcomes the piston 55, and as a result the driving action is returned to the smaller sun pinion 4. The joint effect of the pistons 65 and 66 is to engage the reaction pinion 9 with the housing 3 by engagement of the brake disc 40 with the fixed member 43. The epicyclic gear train is now controlled by the stationary reaction pinion 9 through the planet pinions 14, 15, and although the ring 21 is still locked by the pawl 17 the reaction annulus 19 is able to overrun through the one way device 22. The drive is accordingly again transmitted through the pinions 11.

To obtain the fourth speed, the pistons 50, 55 and 66 remain energised, and the pistons 56 and 65, which of necessity operate together as the cylinder 58 and 69 are permanently connected, are released. The effect of releasing the pistons 56 and 65 is to allow the piston 55 to re-engage the smaller driven clutch member 33 with the member 24 in the manner already described, so restoring the driving action to the larger sun pinion 6. The condition of the epicyclic elements is otherwise unchanged as compared with the third speed position.

To obtain the fifth speed, the pistons 50, 55 and 66 remain in action, and the piston 73 is energised to interlock the reaction pinion 9 and the larger sun pinion 6, so causing the main input and output shafts 27 and 13 to be driven at the same speed to provide a direct drive. Interlocking of the reaction pinion 9 and the sun pinion 6 results from axial movement of the clutch disc 47 by the piston 73 into clutching engagement with the clutch disc 40. The force exerted by the piston 73 overcomes the opposing force exerted by the piston 66, the piston 65 now being inactive, so that clutching engagement of the discs 47 and 40 moves the latter axially for simultaneous smooth disengagement from the stationary clutch member 43.

The reverse gear condition is achieved by moving the pawl 17 to the left as shown in FIGURE 1, under the control of the driver. This locks the reaction annulus 16, and the hydraulic pistons are actuated as already described to transmit the drive from the driving clutch member 24 to the smaller sun pinion 4. As a result, reverse motion is transmitted to the output shaft 13 from the sun pinion 4 through the compound planet pinions 11, 10 to the output shaft 13 on which the carrier 12 is formed, with movement of the compound pinions 11, 10 controlled by the other compound planet pinions 14, 15 the latter of which is in mesh with the pinion 10 and now runs around the stationary reaction annulus 16.

Any convenient valve mechanism is employed for controlling the above-described actions of the pistons in the correct and desired sequence. All the hydraulic pistons are controlled by the same hydraulic pressure, the effective areas of the pistons being chosen so that opposing piston forces have the described relationship.

By the arrangement above described the desirable advantage is obtained that smooth speed changes can be ensured irrespective of the viscosity of the hydraulic fluid, which is usually oil, and moreover the change from one speed to another can be effected without interrupting the drive through the mechanism.

I claim:

1. In an epicyclic power transmission mechanism comprising an input shaft, an output shaft, first and second epicyclic driving elements which can selectively be coupled to said input shaft to provide alternative epicyclic drive paths through said mechanism between said shafts, and a reaction pinion which can be controlled to provide alternative drive ratios: control means comprising a driving clutch member operatively connected to said input shaft, first and second driven clutch members for alternative frictional clutching engagement with said driving clutch member and adapted to transmit the drive to said first and second driving elements respectively, first and second oppositely acting fluid-operated pistons for imparting opposite axial movements to one of said driven clutch members, a third clutch member associated with said reaction pinion, a fourth clutch member associated with an epicyclic element of the mechanism and arranged for frictional clutching engagement with said third clutch member, third and fourth fluid-operated pistons for actuating said third clutch member, one of the last-mentioned two pistons being permanently connected in the fluid sense with one of said first-mentioned two oppositely acting pistons, and a fifth fluid-operated piston for causing axial movement of said driving clutch member into clutching engagement with the other of said driven clutch members, against spring loading, and wherein the first fluid operated piston, which moves the one driven clutch member towards and into clutching engagement with the driving clutch member, is arranged to exert a force which overcomes the force exerted by said fifth piston, whereby to effect simultaneous disengagement of the driving clutch member from said other driven clutch member.

2. In an epicyclic power transmission mechanism comprising an input shaft, an output shaft, first and second epicyclic driving elements, which can selectively be coupled to said input shaft to provide alternative epicyclic drive paths through said mechanism between said shafts, and a reaction pinion which can be controlled to provide alternative drive ratios: control means comprising a driving clutch member with an inner peripheral clutch surface of frusto-conical form, first and second driven clutch members for alternative frictional clutching engagement with said driving clutch member and adapted to transmit the drive to said first and second epicyclic driving elements respectively, said driven clutch members being of different effective diameters and axially spaced with outer frusto-conical clutch surfaces for engagement, first and second oppositely acting fluid-operated pistons for imparting opposite axial movements to one of said driven clutch members, a third clutch member associated with an epicyclic element of the mechanism and arranged for frictional clutching engagement with said third clutch member, one of the last-mentioned two pistons being permanently connected in the fluid sense with one of said first-mentioned two oppositely acting pistons, and a fifth fluid-operated piston for causing axial movement of said driving clutch member into clutching engagement with the other of said driven clutch members, against spring loading, and wherein the first fluid-operated piston, which moves the one driven clutch member towards and into clutching engagement with the driving clutch member, is arranged to exert a force which overcomes the force exerted by said fifth piston, whereby to effect simultaneous disengagement of the driving clutch member from said other driven clutch member.

3. An epicyclic power transmission mechanism comprising an input shaft, an output shaft, two sun pinions of different diameters which can be selectively coupled to said input shaft to provide alternative epicyclic drive paths through said mechanism between said shafts, a fixed brake member, and a reaction pinion which can be alternatively braked to said brake member or coupled to one of said sun pinions to provide alternative drive ratios; and control means comprising a driving clutch member coupled to said input shaft, first and second driven clutch members respectively coupled to said sun pinions and arranged to alternative frictional clutching engagement with said driving clutch member, first and second oppositely acting fluid-operated pistons for imparting opposite axial movements to one of said driven clutch members, a third clutch member coupled to said reaction pinion, a fourth clutch member coupled to said one sun pinion, said third clutch member being arranged for alternative engagement with said brake member or said fourth clutch member, third and fourth fluid-operated pistons for actuating said third clutch member, one of the last-mentioned two pistons being permanently connected in the fluid sense with one of said first-mentioned two oppositely acting pistons, and a fifth fluid operated piston for causing axial movement of said driving clutch member into clutching engagement with the other of said driven clutch members, against spring loading, wherein the first fluid-operated piston, which moves the one driven clutch member towards and into clutching engagement with the driving clutch member, is arranged to exert a force which overcomes the force exerted by said fifth piston, whereby to effect simultaneous disengagement of the driving clutch member from said driven clutch member.

4. Control means according to claim 3, wherein the two pistons for actuating said third clutch member act in the same direction to effect clutching engagement of said third clutch member with the fixed brake member.

5. Control means according to claim 4, including a sixth hydraulic piston which acts to move said fourth clutch member into clutching engagement with said third clutch member and simultaneously to move the latter member out of clutching engagement with the fixed brake member.

6. Control means according to claim 5, wherein said sixth piston being arranged to overcome the force exerted by the piston for actuating said third clutch member associated with the reaction pinion which is not permanently connected in the fluid sense to one of the two oppositely acting pistons.

References Cited by the Examiner
UNITED STATES PATENTS

| | | | |
|---|---|---|---|
| 3,007,562 | 11/61 | Aschauer | 192—86 X |
| 3,010,343 | 11/61 | Orr et al. | 74—753 |
| 3,071,985 | 1/63 | Wickman | 74—761 |

DON A. WAITE, *Primary Examiner*.